US009418824B2

(12) United States Patent
Wildgoose

(10) Patent No.: US 9,418,824 B2
(45) Date of Patent: Aug. 16, 2016

(54) LOCK COMPONENT CORRECTIONS

(71) Applicant: Micromass UK Limited, Wilmslow (GB)

(72) Inventor: Jason Lee Wildgoose, Stockport (GB)

(73) Assignee: Micromass UK Limited, Wilmslow (GB)

( * ) Notice: Subject to any disclaimer, the term of this patent is extended or adjusted under 35 U.S.C. 154(b) by 0 days.

(21) Appl. No.: 14/772,456

(22) PCT Filed: Mar. 5, 2014

(86) PCT No.: PCT/GB2014/050643
§ 371 (c)(1),
(2) Date: Sep. 3, 2015

(87) PCT Pub. No.: WO2014/135866
PCT Pub. Date: Sep. 12, 2014

(65) Prior Publication Data

US 2016/0013036 A1 Jan. 14, 2016

(30) Foreign Application Priority Data

Mar. 6, 2013 (EP) .................................... 13158049
Mar. 6, 2013 (GB) .................................. 1304040.7

(51) Int. Cl.
*G01D 18/00* (2006.01)
*H01J 49/00* (2006.01)
*H01J 49/40* (2006.01)

(52) U.S. Cl.
CPC ......... *H01J 49/0009* (2013.01); *H01J 49/0027* (2013.01); *H01J 49/40* (2013.01)

(58) Field of Classification Search
CPC .... H01J 49/40; H01J 49/0009; H01J 49/0027
USPC ...................................................... 250/252.1
See application file for complete search history.

(56) References Cited

U.S. PATENT DOCUMENTS 6,437,325 B1 * 8/2002 Reilly ..................... H01J 49/40 250/252.1
6,519,542 B1 2/2003 Giannuzzi et al.

(Continued)

FOREIGN PATENT DOCUMENTS

EP 1600771 11/2005
GB 2406966 4/2005

(Continued)

OTHER PUBLICATIONS

Eckers et al., "*Accurate Mass Liquid Chromatography/Mass Spectrometry on Orthogonal Acceleration Time-of-Flight Mass Analyzers Using Switching Between Separate Sample and Reference Sprays. 1. Proof of Concept*", Analytical Chemistry, vol. 72, No. 16, pp. 3683-3668, 2000.

(Continued)

*Primary Examiner* — David J Makiya
*Assistant Examiner* — Taeho Jo
(74) *Attorney, Agent, or Firm* — Diederiks & Whitelaw, PLC

(57) ABSTRACT

A method of mass spectrometry is disclosed comprising initially calibrating or recalibrating a mass spectrometer at a time $T_0$ and at the same time measuring a time of flight or mass to charge ratio $M_0$ of one or more lockmass ions. The mass spectrometer is then operated at a subsequent time $T_1$ and the time of flight or mass to charge ratio $M_1$ of the one or more lockmass ions is measured at subsequent time $T_1$. The time of flight or mass to charge ratio of ions is then adjusted by or based upon the difference between the time of flight or mass to charge ratio $M_1$ of the one or more lockmass ions as measured at time $T_1$ and the time of flight or mass to charge ratio $M_0$ of the one or more lockmass ions as measured at time $T_0$.

13 Claims, 1 Drawing Sheet

(56) References Cited

U.S. PATENT DOCUMENTS

| | | | | |
|---|---|---|---|---|
| 8,653,451 | B2 * | 2/2014 | Satoh | H01J 49/403 250/282 |
| 2002/0033447 | A1 * | 3/2002 | Bowdler | H01J 49/0009 250/282 |
| 2003/0034448 | A1 * | 2/2003 | Yefchak | H01J 49/40 250/282 |
| 2003/0062473 | A1 * | 4/2003 | Weinberger | H01J 49/0009 250/287 |
| 2004/0024552 | A1 * | 2/2004 | Bowdler | H01J 49/405 702/89 |
| 2005/0023454 | A1 * | 2/2005 | Bateman | H01J 49/0036 250/288 |
| 2007/0045529 | A1 | 3/2007 | Cao et al. | |
| 2008/0308724 | A1 | 12/2008 | Brekenfeld | |
| 2009/0048797 | A1 * | 2/2009 | Tolmachev | H01J 49/0009 702/85 |
| 2012/0068062 | A1 * | 3/2012 | Satoh | H01J 49/0027 250/282 |
| 2012/0298855 | A1 * | 11/2012 | Satoh | H01J 49/403 250/282 |
| 2013/0075598 | A1 * | 3/2013 | Ledford, Jr. | H01J 49/0009 250/252.1 |

FOREIGN PATENT DOCUMENTS

| | | |
|---|---|---|
| GB | 2488895 | 9/2012 |
| GB | 2494492 | 3/2013 |
| WO | 2012/116131 | 8/2012 |
| WO | 2012/164306 | 12/2012 |

OTHER PUBLICATIONS

Lifang et al., "*A Modified Internal Lock-Mass Method for Calibration of the Product Ions Derived from Sustained Off-Resonance Irradiation Collision-Induced Dissociation Using a Fourier Transform Mass Spectrometer*", Rapid Communications in Mass Spectrometry, vol. 18, No. 12, pp. 1286-1294, 2004.

Olsen et al., "*Parts per Million Mass Accuracy on an Orbitrap Mass Spectrometer via Lock Mass Injection into a C-Trap*", Molecular & Cellular Proteomics, vol. 4, No. 12, pp. 2010-2021, 2005.

* cited by examiner

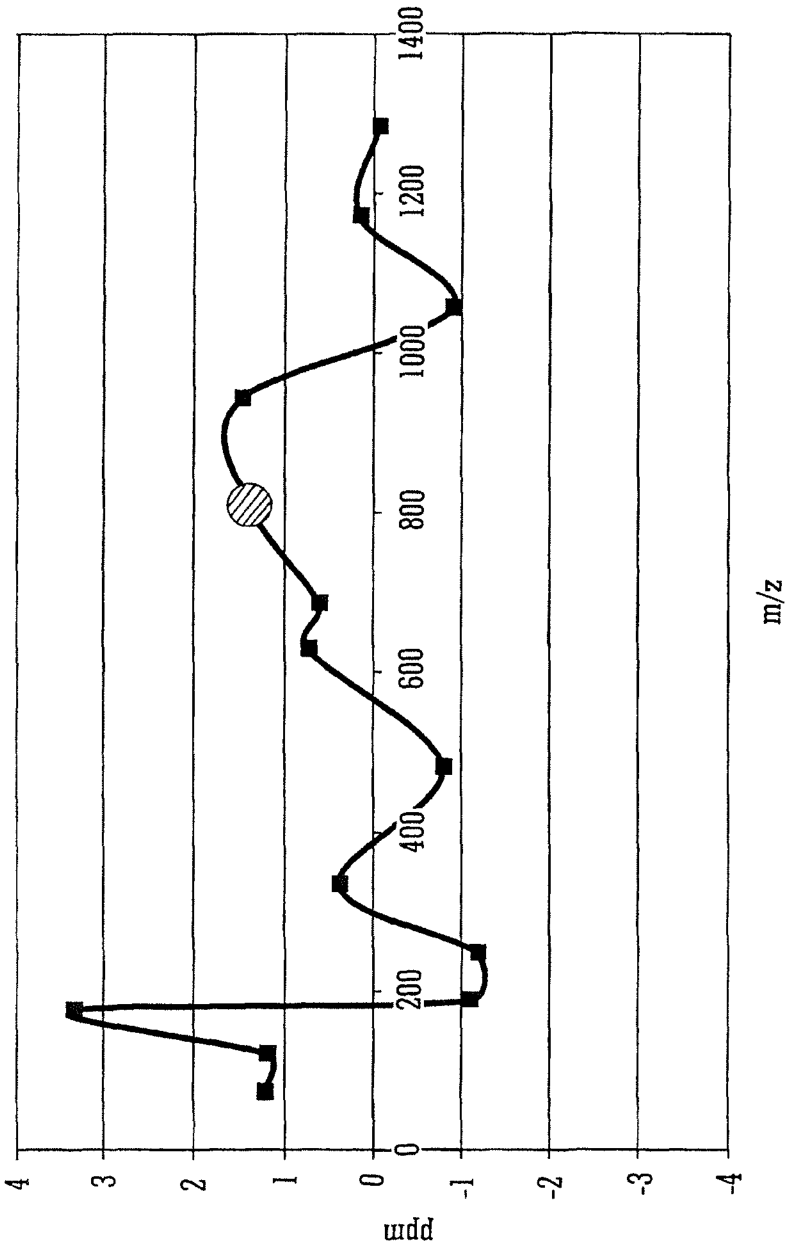
ppm
4
3
2
1
0
-1
-2
-3
-4
m/z
0
200
400
600
800
1000
1200
1400

LOCK COMPONENT CORRECTIONS

CROSS-REFERENCE TO RELATED APPLICATION

This application is the National Stage of International Application No. PCT/GB2014/050643, filed 5 Mar. 2014 which claims priority from and the benefit of United Kingdom patent application No. 1304040.7 filed on 6 Mar. 2013 and European patent application No. 13158049.0 filed 6 Mar. 2013. The entire contents of these applications are incorporated herein by reference.

BACKGROUND OF THE PRESENT INVENTION

The present invention relates to a method of mass spectrometry and a mass spectrometer.

It is known initially to calibrate a mass spectrometer. A known initial calibration routine involves utilising a calibration file in conjunction with a number of known compounds. Different known species of ions having different mass to charge ratios are mass analysed and the time of flight or mass to charge ratio of the different species of ions is determined. The correspondence between the measured time of flight or the mass to charge ratio of the known different species of ions and the theoretical mass to charge ratio of the ions as held in the calibration file is determined. A calibration curve is then fitted and adjusted to minimise the errors between the experimentally determined values and the theoretical values of the initial calibration compounds. In particular, a 5th order polynomial calibration curve may be fitted to the experimental data and the terms of the 5th order polynomial calibration curve may be adjusted so that the RMS error is as low as possible. The calibration curve is then used in subsequent mass analyses.

During subsequent operation of a mass spectrometer the mass spectrometer may experience changing conditions which can potentially have a significant impact upon the measured time of flight (and hence determined mass to charge ratio) of ions by the Time of Flight mass analyser. In particular, a temperature change of 1° C. can shift the measured time of flight and measured mass to charge ratio of all ions by approximately 40 ppm.

In order to address this problem it is known during subsequent operation of a mass spectrometer to periodically check the determined time of flight or mass to charge ratio of a known lockmass ion. If the mass spectrometer determines that the measured time of flight or mass to charge ratio of the known lockmass ions has shifted, then the measured time of flight or mass to charge ratio of all ions is then globally adjusted to correct for the shift. The adjustment which is applied is a global adjustment to the measured mass to charge ratios of all ions and reflects the fact that there has been a global shift in measured mass to charge ratios due e.g. to an increase in temperature.

The known calibration approach and subsequent lockmass correction method is imperfect and different residual calibration errors will remain at different mass to charge ratios.

FIG. 1 shows some of the residual calibration errors following an initial conventional calibration routine. It is apparent that the residual calibration errors may typically be a few ppm.

One problem with the known lockmass correction approach is that it can introduce systematic errors.

Conventional mass spectrometers which seek to correct for global shifts by using lock components adjust the mass spectral data to correct for any discrepancy between the measured mass to charge ratio of the lockmass ions and the theoretical mass to charge ratio of the lockmass ions. However, this approach to lockmass correction can inadvertently result in systematic errors being introduced through a variety of sources particularly mass calibration residuals.

GB-2494492 (Micromass) discloses a method to single point internal lock-mobility correction.

GB-2406966 (Klee) discloses a method of correcting spectral skew in a mass spectrometer.

U.S. Pat. No. 6,519,542 (Giannuzzi) discloses a method of testing an unknown sample with an analytical tool.

It is desired to provide an improved mass spectrometer and method of mass spectrometry.

SUMMARY OF THE PRESENT INVENTION

According to an aspect of the present invention there is provided a method of mass spectrometry comprising:

initially calibrating or re-calibrating a mass spectrometer at a time $T_0$ and at substantially the same time measuring a time of flight or mass to charge ratio $M_0$ of one or more lockmass ions;

operating the mass spectrometer at a subsequent time $T_1$;

measuring the time of flight or mass to charge ratio $M_1$ of the one or more lockmass ions at the time $T_1$; and adjusting the time of flight or mass to charge ratio of ions by or based upon the difference between the time of flight or mass to charge ratio $M_1$ of the one or more lockmass ions as measured at the time $T_1$ and the time of flight or mass to charge ratio $M_0$ of the one or more lockmass ions as measured at the time $T_0$.

The present invention is concerned with removing some sources of systematic error in lock component corrections thereby ultimately improving spectra accuracy.

Improved lock component (i.e. mass or mobility) correction is a new mode of operation for existing instrument geometries and future novel instrument geometries.

The present invention provides the capability to improve the accuracy of mass or mobility spectra data by accounting for instrument drift. Known approaches that attempt to compensate for drift suffer from the problem that they can introduce systematic accuracy errors.

The preferred device preferably comprises at least one ion separation device such as an ion mobility separator ("IMS") or a mass spectrometer ("MS") and a method of calibration. In addition the ability to introduce a lock component such as a lockmass is also required.

The method and apparatus according to the present invention may involve initially calibrating a mass spectrometer at a time $T_0$. Alternatively, the mass spectrometer may already be calibrated and at time $T_0$ the mass spectrometer is recalibrated.

According to an aspect of the present invention there is provided a method of mass spectrometry comprising:

initially calibrating a mass spectrometer at a time $T_0$ and at substantially the same time measuring an uncorrected time of flight or mass to charge ratio $M_0$ of one or more lockmass ions;

operating the mass spectrometer at a subsequent time $T_1$;

determining or measuring the time of flight or mass to charge ratio $M_1$ of the one or more lockmass ions at the time $T_1$; and adjusting the determined time of flight or mass to charge ratio of ions by or based upon the difference between the determined time of flight or mass to charge ratio $M_1$ of the one or more lockmass ions at the time $T_1$ and the uncorrected time of flight or mass to charge ratio $M_0$ of the one or more lockmass ions at the time $T_0$.

According to another aspect of the present invention there is provided a method of mass spectrometry comprising:

initially calibrating a mass spectrometer at a time $T_0$ and at substantially the same time measuring an uncorrected time of flight or mass to charge ratio $M_0$ of one or more lockmass ions;

operating the mass spectrometer at a subsequent time $T_1$;

measuring the time of flight or mass to charge ratio $M_1$ of the one or more lockmass ions at the time $T_1$; and adjusting the time of flight or mass to charge ratio of ions by or based upon the difference between the time of flight or mass to charge ratio $M_1$ of the one or more lockmass ions as measured at the time $T_1$ and the uncorrected time of flight or mass to charge ratio $M_0$ of the one or more lockmass ions as measured at the time $T_0$.

The step of initially calibrating or recalibrating the mass spectrometer at the time $T_0$ preferably comprises performing a calibration routine to produce a calibration curve.

The calibration curve preferably corresponds to a curve of best fit which relates the measured mass to charge ratio or time of flight of a plurality of known ions with the actual or known mass to charge ratio or time of flight of the plurality of known ions.

The time of flight or mass to charge ratio $M_0$ of the one or more lockmass ions at time $T_0$ (which is preferably uncorrected or uncalibrated) preferably comprises a measured time of flight or mass to charge ratio of the one or more lockmass ions prior to the application of the calibration curve.

The step of adjusting the determined time of flight or mass to charge ratio of the ions preferably further comprises adjusting an instrument or voltage setting of the mass spectrometer based upon the adjustment of the determined time of flight or mass to charge ratio of the ions.

According to another aspect of the present invention there is provided a mass spectrometer comprising:

a control system arranged and adapted:

(i) to initially calibrate or re-calibrate the mass spectrometer at a time $T_0$ and at substantially the same time to measure a time of flight or mass to charge ratio $M_0$ of one or more lockmass ions;

(ii) to operate the mass spectrometer at a subsequent time $T_1$;

(iii) to determine or measure the time of flight or mass to charge ratio $M_1$ of the one or more lockmass ions at the time $T_1$; and (iv) to adjust the determined time of flight or mass to charge ratio of ions by or based upon the difference between the determined time of flight or mass to charge ratio $M_1$ of the one or more lockmass ions at the time $T_1$ and the time of flight or mass to charge ratio $M_0$ of the one or more lockmass ions at the time $T_0$.

The time of flight or mass to charge ratio $M_0$ of the one or more lockmass ions at time $T_0$ is preferably uncorrected or uncalibrated.

The control system is preferably further arranged and adapted to adjust an instrument or voltage setting of the mass spectrometer based upon the adjustment of the determined time of flight or mass to charge ratio of the ions.

According to another aspect of the present invention there is provided a method comprising:

initially calibrating an analytical instrument at a time $T_0$ and at substantially the same time measuring a physico-chemical property $P_0$ of one or more first ions;

operating the analytical instrument at a subsequent time $T_1$; determining the physico-chemical property $P_1$ of the one or more first ions at the time $T_1$; and adjusting the determined physico-chemical of ions by or based upon the difference between the determined physico-chemical property $P_1$ of the one or more first ions at the time $T_1$ and the physico-chemical property $P_0$ of the one or more first ions at the time $T_0$.

The physico-chemical property $P_0$ of the one or more first ions at time $T_0$ is preferably uncorrected or uncalibrated.

The physico-chemical property preferably comprises time of flight, mass, mass to charge ratio, ion mobility, differential ion mobility or elution time.

The first ions preferably comprise lockmass ions. However, other embodiments are contemplated wherein the first ions comprise ions have fixed or locked time of flight, mass to charge ratio, ion mobility, differential ion mobility or elution time.

According to another aspect of the present invention there is provided a method of mass spectrometry comprising a method as described above.

According to another aspect of the present invention there is provided an analytical instrument comprising:

a control system arranged and adapted:

(i) to initially calibrate or re-calibrate the analytical instrument at a time $T_0$ and at substantially the same time to measure an uncorrected physico-chemical property $P_0$ of one or more first ions;

(ii) to operate the analytical instrument at a subsequent time $T_1$;

(iii) to determine or measure the physico-chemical property $P_1$ of the one or more first ions at the time $T_1$; and (iv) to adjust the determined physico-chemical property of ions by or based upon the difference between the determined physico-chemical property $P_1$ of the one or more first ions at the time $T_1$ and the physico-chemical property $P_0$ of the one or more first ions at the time $T_0$.

The physico-chemical property preferably comprises time of flight, mass, mass to charge ratio, ion mobility, differential ion mobility or elution time.

According to another aspect of the present invention there is provided a mass spectrometer comprising an analytical instrument as described above.

According to an embodiment the mass spectrometer may further comprise:

(a) an ion source selected from the group consisting of: (i) an Electrospray ionisation ("ESI") ion source; (ii) an Atmospheric Pressure Photo Ionisation ("APPI") ion source; (iii) an Atmospheric Pressure Chemical Ionisation ("APCI") ion source; (iv) a Matrix Assisted Laser Desorption Ionisation ("MALDI") ion source; (v) a Laser Desorption Ionisation ("LDI") ion source; (vi) an Atmospheric Pressure Ionisation ("API") ion source; (vii) a Desorption Ionisation on Silicon ("DIOS") ion source; (viii) an Electron Impact ("EI") ion source; (ix) a Chemical Ionisation ("CI") ion source; (x) a Field Ionisation ("FI") ion source; (xi) a Field Desorption ("FD") ion source; (xii) an Inductively Coupled Plasma ("ICP") ion source; (xiii) a Fast Atom Bombardment ("FAB") ion source; (xiv) a Liquid Secondary Ion Mass Spectrometry ("LSIMS") ion source; (xv) a Desorption Electrospray Ionisation ("DESI") ion source; (xvi) a Nickel-63 radioactive ion source; (xvii) an Atmospheric Pressure Matrix Assisted Laser Desorption Ionisation ion source; (xviii) a Thermospray ion source; (xix) an Atmospheric Sampling Glow Discharge Ionisation ("ASGDI") ion source; (xx) a Glow Discharge ("GD")

ion source; (xxi) an Impactor ion source; (xxii) a Direct Analysis in Real Time ("DART") ion source; (xxiii) a Laserspray Ionisation ("LSI") ion source; (xxiv) a Sonicspray Ionisation ("SSI") ion source; (xxv) a Matrix Assisted Inlet Ionisation ("MAII") ion source; and (xxvi) a Solvent Assisted Inlet Ionisation ("SAII") ion source; and/or (b) one or more continuous or pulsed ion sources; and/or (c) one or more ion guides; and/or (d) one or more ion mobility separation devices and/or one or more Field Asymmetric Ion Mobility Spectrometer devices; and/or (e) one or more ion traps or one or more ion trapping regions; and/or (f) one or more collision, fragmentation or reaction cells selected from the group consisting of: (i) a Collisional Induced Dissociation ("CID") fragmentation device; (ii) a Surface Induced Dissociation ("SID") fragmentation device; (iii) an Electron Transfer Dissociation ("ETD") fragmentation device; (iv) an Electron Capture Dissociation ("ECD") fragmentation device; (v) an Electron Collision or Impact Dissociation fragmentation device; (vi) a Photo Induced Dissociation ("PID") fragmentation device; (vii) a Laser Induced Dissociation fragmentation device; (viii) an infrared radiation induced dissociation device; (ix) an ultraviolet radiation induced dissociation device; (x) a nozzle-skimmer interface fragmentation device; (xi) an in-source fragmentation device; (xii) an in-source Collision Induced Dissociation fragmentation device; (xiii) a thermal or temperature source fragmentation device; (xiv) an electric field induced fragmentation device; (xv) a magnetic field induced fragmentation device; (xvi) an enzyme digestion or enzyme degradation fragmentation device; (xvii) an ion-ion reaction fragmentation device; (xviii) an ion-molecule reaction fragmentation device; (xix) an ion-atom reaction fragmentation device; (xx) an ion-metastable ion reaction fragmentation device; (xxi) an ion-metastable molecule reaction fragmentation device; (xxii) an ion-metastable atom reaction fragmentation device; (xxiii) an ion-ion reaction device for reacting ions to form adduct or product ions; (xxiv) an ion-molecule reaction device for reacting ions to form adduct or product ions; (xxv) an ion-atom reaction device for reacting ions to form adduct or product ions; (xxvi) an ion-metastable ion reaction device for reacting ions to form adduct or product ions; (xxvii) an ion-metastable molecule reaction device for reacting ions to form adduct or product ions; (xxviii) an ion-metastable atom reaction device for reacting ions to form adduct or product ions; and (xxix) an Electron Ionisation Dissociation ("EID") fragmentation device; and/or (g) a mass analyser selected from the group consisting of: (i) a quadrupole mass analyser; (ii) a 2D or linear quadrupole mass analyser; (iii) a Paul or 3D quadrupole mass analyser; (iv) a Penning trap mass analyser; (v) an ion trap mass analyser; (vi) a magnetic sector mass analyser; (vii) Ion Cyclotron Resonance ("ICR") mass analyser; (viii) a Fourier Transform Ion Cyclotron Resonance ("FTICR") mass analyser; (ix) an electrostatic mass analyser arranged to generate an electrostatic field having a quadro-logarithmic potential distribution; (x) a Fourier Transform electrostatic mass analyser; (xi) a Fourier Transform mass analyser; (xii) a Time of Flight mass analyser; (xiii) an orthogonal acceleration Time of Flight mass analyser; and (xiv) a linear acceleration Time of Flight mass analyser; and/or (h) one or more energy analysers or electrostatic energy analysers; and/or (i) one or more ion detectors; and/or (j) one or more mass filters selected from the group consisting of: (i) a quadrupole mass filter; (ii) a 2D or linear quadrupole ion trap; (iii) a Paul or 3D quadrupole ion trap; (iv) a Penning ion trap; (v) an ion trap; (vi) a magnetic sector mass filter; (vii) a Time of Flight mass filter; and (viii) a Wien filter; and/or (k) a device or ion gate for pulsing ions; and/or (l) a device for converting a substantially continuous ion beam into a pulsed ion beam.

The mass spectrometer may further comprise either:

(i) a C-trap and a mass analyser comprising an outer barrel-like electrode and a coaxial inner spindle-like electrode that form an electrostatic field with a quadro-logarithmic potential distribution, wherein in a first mode of operation ions are transmitted to the C-trap and are then injected into the mass analyser and wherein in a second mode of operation ions are transmitted to the C-trap and then to a collision cell or Electron Transfer Dissociation device wherein at least some ions are fragmented into fragment ions, and wherein the fragment ions are then transmitted to the C-trap before being injected into the mass analyser; and/or (ii) a stacked ring ion guide comprising a plurality of electrodes each having an aperture through which ions are transmitted in use and wherein the spacing of the electrodes increases along the length of the ion path, and wherein the apertures in the electrodes in an upstream section of the ion guide have a first diameter and wherein the apertures in the electrodes in a downstream section of the ion guide have a second diameter which is smaller than the first diameter, and wherein opposite phases of an AC or RF voltage are applied, in use, to successive electrodes.

According to an embodiment the mass spectrometer further comprises a device arranged and adapted to supply an AC or RF voltage to the electrodes. The AC or RF voltage preferably has an amplitude selected from the group consisting of: (i) <50 V peak to peak; (ii) 50-100 V peak to peak; (iii) 100-150 V peak to peak; (iv) 150-200 V peak to peak; (v) 200-250 V peak to peak; (vi) 250-300 V peak to peak; (vii) 300-350 V peak to peak; (viii) 350-400 V peak to peak; (ix) 400-450 V peak to peak; (x) 450-500 V peak to peak; and (xi) >500 V peak to peak.

The AC or RF voltage preferably has a frequency selected from the group consisting of: (i) <100 kHz; (ii) 100-200 kHz; (iii) 200-300 kHz; (iv) 300-400 kHz; (v) 400-500 kHz; (vi) 0.5-1.0 MHz; (vii) 1.0-1.5 MHz; (viii) 1.5-2.0 MHz; (ix) 2.0-2.5 MHz; (x) 2.5-3.0 MHz; (xi) 3.0-3.5 MHz; (xii) 3.5-4.0 MHz; (xiii) 4.0-4.5 MHz; (xiv) 4.5-5.0 MHz; (xv) 5.0-5.5 MHz; (xvi) 5.5-6.0 MHz; (xvii) 6.0-6.5 MHz; (xviii) 6.5-7.0 MHz; (xix) 7.0-7.5 MHz; (xx) 7.5-8.0 MHz; (xxi) 8.0-8.5 MHz; (xxii) 8.5-9.0 MHz; (xxiii) 9.0-9.5 MHz; (xxiv) 9.5-10.0 MHz; and (xxv) >10.0 MHz.

The mass spectrometer may also comprise a chromatography or other separation device upstream of an ion source. According to an embodiment the chromatography separation device comprises a liquid chromatography or gas chromatography device. According to another embodiment the separation device may comprise: (i) a Capillary Electrophoresis ("CE") separation device; (ii) a Capillary Electrochromatography ("CEC") separation device; (iii) a substantially rigid ceramic-based multilayer microfluidic substrate ("ceramic tile") separation device; or (iv) a supercritical fluid chromatography separation device.

The ion guide is preferably maintained at a pressure selected from the group consisting of: (i) <0.0001 mbar; (ii) 0.0001-0.001 mbar; (iii) 0.001-0.01 mbar; (iv) 0.01-0.1 mbar; (v) 0.1-1 mbar; (vi) 1-10 mbar; (vii) 10-100 mbar; (viii) 100-1000 mbar; and (ix) >1000 mbar.

BRIEF DESCRIPTION OF THE DRAWINGS

Various embodiments of the present invention together with a known method given for illustrative purposes only will now be described, by way of example only, and with reference to the accompanying drawing in which:

FIG. 1 shows calibration residuals resulting from a known calibration method with a conventional orthogonal acceleration Time of Flight mass analyser.

DETAILED DESCRIPTION OF PREFERRED EMBODIMENTS

The known approach to lockmass correction has proven to be a useful tool for improving mass measurement accuracy. Lockmass corrections have been employed to compensate for mass scale drift due to various factors such as temperature related length changes and the variation of voltages in orthogonal acceleration Time of Flight mass spectrometry.

It is known to perform an initial calibration routine and then during subsequent operation to introduce one or more known lockmasses and to measure the mass to charge ratio of the lockmass ions. The lockmasses may be introduced in isolation via a lockspray or alternatively the lockmasses may be introduced so that they are mixed with analyte ions via an internal lockmass approach.

The measured mass to charge ratio values of the lockmass or lockmasses are then compared with the theoretical mass to charge values of the known lockmass components. The differences between the measured values and the theoretical values are then used to calculate a global adjustment or shift in mass to charge ratio which is then applied to all mass spectral data to correct for the instrument drift.

Whilst this approach has proven useful, it is not without drawbacks.

FIG. 1 illustrates one of the drawbacks of the known approach. FIG. 1 shows some of the calibration residuals after initially calibrating a conventional orthogonal acceleration Time of Flight mass analyser. In this data the root mean square of the residuals is approximately 1.3 ppm. In practice this means that the absolute measurement of a particular mass to charge ratio could be up to 3-4 ppm in error immediately subsequent to initial calibration. For example, ions which are measured and which have a mass to charge ratio around 800 will be determined to have a mass to charge ratio which is in fact 1.5 ppm away from the correct value.

The individual mass to charge ratio precision values were reduced to less than 0.1 ppm so the effect of precision on these data was minimised. The ions were also free from interferences and below saturation limits.

If the highlighted ion at mass to charge ratio 800 (or an ion having a similar mass to charge ratio) were utilised as a lockmass ion to correct for subsequent instrument shift during operation (due e.g. to an increase in temperature) then it is apparent that this would introduce a systematic −1.5 ppm error to all the data since all mass spectral data would be shifted by −1.5 ppm from the correct value. Even without instrument drift, lockmassing using the conventional approach would still make mass spectral data worse in terms of mass measurement accuracy.

Traditionally these effects have not been limiting as other source of mass measurement error have dominated such as the likelihood of interference, detector saturation and mass precision. However, recent improvements in instrument performance and in particular improvements in mass to charge ratio resolution and overcoming problems of detector saturation have advanced to a stage where residual calibration effects can now be a significant consideration.

The present invention seeks to alleviate some of these problems. According to the present invention the nominated lockmass or lockmasses are measured at the same time (or close to the same time) as when an initial calibration routine is executed.

The measured lockmass values are then stored or recorded allowing future lockmass measurements to be compared with the actual lockmass measurement at the time of calibration rather than the theoretical lockmass value. The remainder of the lockmass correction routine completes as normal following this step.

The advantage of the approach according to the preferred embodiment is that the act of lock mass correction now solely compensates for instrument drift rather than seeking to correct for instrument drift whilst potentially inadvertently introducing a systematic calibration error. In the example described above the data would be corrected back to the theoretical value +1.5 ppm according to the preferred embodiment thereby removing a 1.5 ppm system error which would otherwise be introduced by the conventional lockmass correction method.

The approach according to the preferred embodiment also has the added advantage that the actual or theoretical mass to charge ratio of the lockmass ions does not actually need to be known. As long as the nominated lockmasses are consistent, the act of measuring them at the point of initial calibration removes the need to know their accurate mass.

The approach according to the preferred embodiment and as described above can be applied to all types of mass spectrometers including orthogonal acceleration Time of Flight mass analysers, Fourier Transform Mass Spectrometers (FT-ICR), electrostatic mass analysers arranged to generate an electrostatic field having a quadro-logarithmic potential distribution, non Fourier Transform ion traps, quadrupole based systems and magnetic sector based instruments.

According to less preferred embodiments the approach can be applied to other analytical instruments such as ion mobility spectrometers, Field Asymmetric Ion Mobility Spectrometers ("FAIMS"), Differential Mobility Spectrometers ("DMS"), chromatography etc.

According to an embodiment more than one lock component may be used.

It is recognised that the measurement of the lock component or components may be made in multiple dimensions of separation such as mass to charge ratio and ion mobility and that the approach can be applied to the multiple dimensional data.

According to a less preferred embodiment one or more of the lock components may not be a ion signal and may be an electronic signal such a pulse triggered from a pusher voltage for calibration time offset correction in Time of Flight mass spectrometry.

According to an embodiment other sources of systematic error may be compensated for via the approach according to the preferred embodiment including charges state effects, intensity or saturation effects and interference effects (although some of these may require the control of other aspects such as intensity etc).

The approach according to the preferred embodiment can compensate for instrument changes between the calibration and lock mass channels such as lens settings, mass range settings (RF and pusher period), travelling wave setting as well as 'mode changes' such as IMS, Time of Flight, Enhanced Duty Cycle ("EDC"), High Duty Cycle ("HDC") or combinations of modes.

The preferred approach can be applied in the acquisition domain such as the time domain for orthogonal acceleration Time of Flight mass analysis or the frequency domain for FT-MS.

The preferred approach can be applied to both internal and external lock components or data sets combining an external lock component with analyte data.

It is recognised that combined data may utilise this approach.

The preferred approach may be used to adjust instrument conditions (e.g. a voltage) so as to correct for calibration drift.

The present invention has particularly applicability for future generation instruments particularly orthogonal acceleration Time of Flight mass analysers and/or IMS based instruments.

Although the present invention has been described with reference to preferred embodiments, it will be understood by those skilled in the art that various changes in form and detail may be made without departing from the scope of the invention as set forth in the accompanying claims.

The invention claimed is:

1. A method of mass spectrometry comprising:

initially calibrating or re-calibrating a mass spectrometer at a time $T_0$ and at substantially the same time measuring a time of flight or mass to charge ratio $M_0$ of one or more lockmass ions;

operating the mass spectrometer at a subsequent time $T_1$;

measuring the time of flight or mass to charge ratio $M_1$ of said one or more lockmass ions at said time $T_1$; and adjusting the time of flight or mass to charge ratio of ions by or based upon the difference between the time of flight or mass to charge ratio $M_1$ of said one or more lockmass ions as measured at said time $T_1$ and said time of flight or mass to charge ratio $M_0$ of said one or more lockmass ions as measured at said time $T_0$.

2. A method as claimed in claim 1, wherein the step of initially calibrating or re-calibrating said mass spectrometer at said time $T_0$ comprises performing a calibration routine to produce a calibration curve.

3. A method as claimed in claim 2, wherein said calibration curve corresponds to a curve of best fit which relates the measured mass to charge ratio or time of flight of a plurality of known ions with the actual or known mass to charge ratio or time of flight of said plurality of known ions.

4. A method as claimed in claim 2, wherein said time of flight or mass to charge ratio $M_0$ of said one or more lockmass ions comprises a measured time of flight or mass to charge ratio of said one or more lockmass ions prior to the application of said calibration curve.

5. A method as claimed in claim 1, wherein said step of adjusting the determined time of flight or mass to charge ratio of said ions further comprising adjusting an instrument or voltage setting of said mass spectrometer based upon the adjustment of the determined time of flight or mass to charge ratio of said ions.

6. A mass spectrometer comprising:

a control system arranged and adapted:

(i) to initially calibrate or re-calibrate the mass spectrometer at a time $T_0$ and at substantially the same time to measure a time of flight or mass to charge ratio $M_0$ of one or more lockmass ions;

(ii) to operate the mass spectrometer at a subsequent time $T_1$;

(iii) to measure the time of flight or mass to charge ratio $M_1$ of said one or more lockmass ions at said time $T_1$; and (iv) to adjust the time of flight or mass to charge ratio of ions by or based upon the difference between the time of flight or mass to charge ratio $M_1$ of said one or more lockmass ions as measured at said time $T_1$ and said time of flight or mass to charge ratio $M_0$ of said one or more lockmass ions as measured at said time $T_0$.

7. A mass spectrometer as claimed in claim 6, wherein said control system is further arranged and adapted to adjust an instrument or voltage setting of said mass spectrometer based upon the adjustment of the time of flight or mass to charge ratio of said ions.

8. A method comprising:

initially calibrating or re-calibrating an analytical instrument at a time $T_0$ and at substantially the same time measuring a physico-chemical property $P_0$ of one or more first ions;

operating the analytical instrument at a subsequent time $T_1$;

measuring the physico-chemical property $P_1$ of said one or more first ions at said time $T_1$; and adjusting a physico-chemical of ions by or based upon the difference between the physico-chemical property $P_1$ of said one or more first ions as measured at said time $T_1$ and said physico-chemical property $P_0$ of said one or more first ions as measured at said time $T_0$.

9. A method as claimed in claim 8, wherein said physico-chemical property comprises time of flight, mass, mass to charge ratio, ion mobility, differential ion mobility or elution time.

10. A method of mass spectrometry comprising a method as claimed in claim 8.

11. An analytical instrument comprising:

a control system arranged and adapted:

(i) to initially calibrate or re-calibrate the analytical instrument at a time $T_0$ and at substantially the same time to measure a physico-chemical property $P_0$ of one or more first ions;

(ii) to operate the analytical instrument at a subsequent time $T_1$;

(iii) to measure the physico-chemical property $P_1$ of said one or more first ions at said time $T_1$; and (iv) to adjust a determined physico-chemical property of ions by or based upon the difference between the physico-chemical property $P_1$ of said one or more first ions as measured at said time $T_1$ and said physico-chemical property $P_0$ of said one or more first ions as measured at said time $T_0$.

12. An analytical instrument as claimed in claim 11, wherein said physico-chemical property comprises time of flight, mass, mass to charge ratio, ion mobility, differential ion mobility or elution time.

13. A mass spectrometer comprising an analytical instrument as claimed in claim 11.

* * * * *